Figure 1:
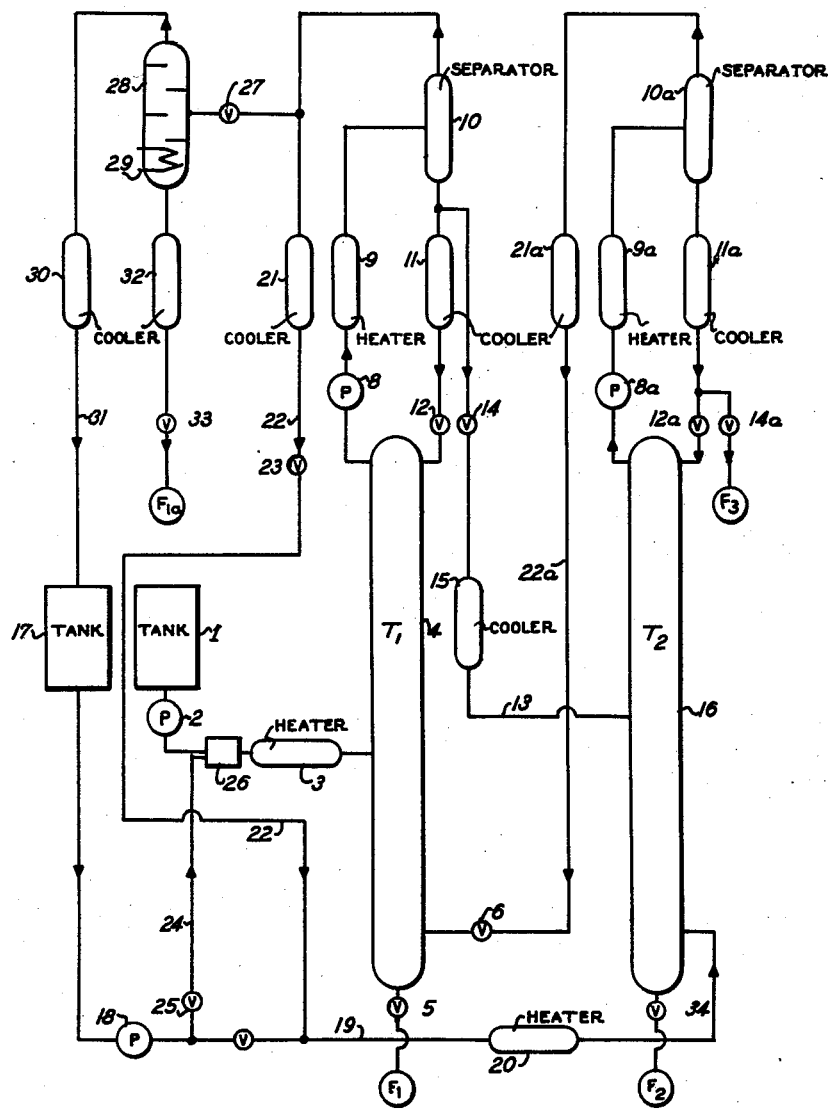

June 21, 1960 H. P. A. GROLL 2,941,941
FRACTIONATION OF OILS BY SELECTIVE EXTRACTION
Filed June 3, 1958 2 Sheets-Sheet 1

INVENTOR
HERBERT P.A. GROLL
BY Burgess and Dinklage
ATTORNEYS

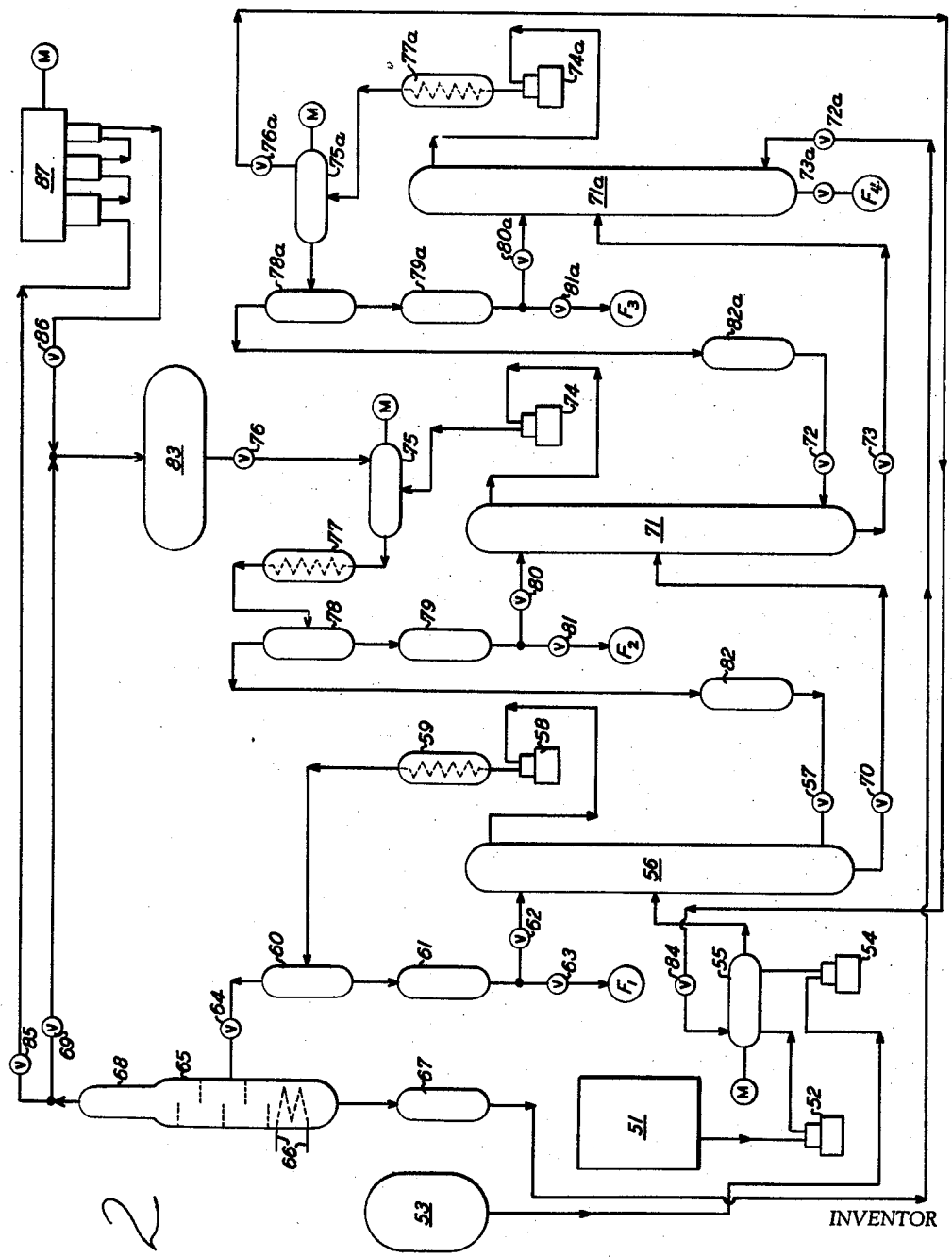

2,941,941

FRACTIONATION OF OILS BY SELECTIVE EXTRACTION

Herbert P. A. Groll, Kyrkogatan 1A, Molndal, Sweden

Filed June 3, 1958, Ser. No. 739,491

Claims priority, application Sweden Aug. 24, 1953

7 Claims. (Cl. 208—319)

This invention pertains to an improvement of the method for fractionating organic materials of higher molecular weight, such as oils and other soluble mixtures of relatively high molecular organic substances by extraction with the aid of a solvent or mixture of solvents (which is in the so-called paracritical state). The method is useful for refining and fractionating mineral oils, e.g., crude oil residues, tar oils, synthetic hydrocarbons, hydrogenation products, tall oil and other natural or synthetic mixtures of fatty acids and of resinous acids as well as glycerides. The method can in certain cases even be applied for fractionating polymerized oils and artificial resins such as boiled linseed oil, standoils, soluble modified alkyds, etc. Suitable solvents are chiefly low boiling hydrocarbons, e.g., ethane, propane, butane, as well as mixtures of such hydrocarbons, e.g., methane and butane, propane and propylene, petroleum ether, etc. Further suitable solvents are substituted hydrocarbons such as dichloromethane, dichloro-difluoro-methane, and other organic and inorganic substances such as carbon dioxide.

In one fractional extraction process to which my invention can be applied, the solvent power of the solvent is adjusted to the desired value by choosing a suitable temperature. An additional fine adjustment can then be achieved by regulating the operating pressure. In this process, liquid solvent is intimately contacted at a relatively low temperature with the organic material in an extraction zone so as to form a liquid extract phase which includes some of the organic material, and a raffinate phase composed of the undissolved organic material. The liquid extract phase is withdrawn from the extraction zone and treated for recovery therefrom of organic material dissolved therein.

The fractional extraction process is usually carried out in columns, and it is therefore advantageous to apply a reflux for enhancing the fractionating effect. Reflux may be obtained by applying a temperature gradient in the column proper. Alternatively, a part of the organic material recovered from the extract phase can be returned to the column as reflux in any convenient way. If desired, reflux can be provided by both maintaining a temperature gradient in the column and returning to the column some of the organic material recovered from the extract phase.

If the oil is recovered from the extract by distillation, heat consumption is undesirably high. This is especially so if high reflux ratios are used. Thus, even at the reflux ratio of 5 to 1 and a concentration of organic materials in the extract phase of 10%, the amount of solvent to be evaporated becomes 60 times the oil throughput of the column.

A preferable manner for effecting separation of organic materials from the extract phase is to adjust the solvent power of the solvent present in the extract phase so that organic material is precipitated therefrom. Thus, the extract phase can be introduced into a separating zone where it is maintained at a relatively high temperature which is in the paracritical temperature range of the solvent present in the extract phase and, preferably, at a pressure sufficient to prevent formation of a gaseous phase in the separating zone. By formation of a gaseous phase is meant a continuous net evolution of gas by evaporation of solvent or evolution of dissolved gas. By this treatment, the extract phase can be made to separate into a solvent phase and a precipitate phase which contains organic material fractionated in the extraction zone.

The term "paracritical state" or "paracritical range" as used in this specification is characterized only by the fact that the solvent power of the solvent is decreased by the temperature being increased. This decrease of the solvent power is essentially an effect of the rapid decrease of the density of the solvent. It is known that within the temperature range of the paracritical state the density of a solvent and thereby its solvent power can be changed by changing the operating pressure. In this case the solvent power is increased by increasing pressure.

Another fractionation process to which my invention can be applied is described in my copending application Serial No. 451,566, filed August 23, 1954. In this process, the solvent power of the solvent in the columns is adjusted to the desired value by the addition of a modifying gas under pressure instead of by adjusting the temperature. It should be noted that the most convenient way of expressing and measuring the amount of modifying gas present in the solvent is the saturation pressure of the gas in the solvent. This has, however, nothing at all to do with the effect of the operating pressure on the solvent power discussed above.

The term "saturation pressure" which I use in this specification should be interpreted only as a convenient way of expressing the physical condition of the solvent gas pair at any point of the system. The saturation pressure is dependent upon the amount of gas dissolved in the solvent as well as on the temperature. It can be determined very easily by withdrawing a sample of the solvent from the apparatus through a sampling valve into a small pressure sampling vessel, the latter being provided with a pressure gauge and a vent valve. The vent valve is closed so that the pressure between the apparatus and the sampling vessel is completely equalized and the sampling vessel is completely filled with the liquid. Then the sampling valve is closed and the vent valve is carefully opened for just a short moment so that only a very small amount of liquid and gas is withdrawn. As soon as the vent valve is closed again the pressure gauge will show a constant pressure which is the saturation pressure.

As is the case with regard to the first described fractionation process, in the process of the copending application, separation of organic material from the extract phase is advantageously effected by treating the extract phase in a separating zone to make it separate into a solvent phase and a precipitate phase which contains organic material fractionated in the extraction zone. In the case of fractionation according to the aforementioned copending application, during the separation of the extract phase, a gas is dissolved therein, and the separation is preferably carried out at a relatively high temperature (i.e., in comparison to the temperature maintained in the extraction zone) which is in the paracritical temperature range of solvent present in the extract phase and at a pressure sufficient to prevent the formation of a gaseous phase in the separating zone (i.e., at or above the saturation pressure).

In each of the two fractionation processes described above, I have now found that it is advantageous to operate the fractionating column at a pressure which is sufficiently high above the vapor pressure of the solvent at the prevailing temperature in order to prevent undesirable formation of a gaseous phase but lower than the pressure desirable for the carrying out of the above-mentioned precipitation of oil from the extract without gas phase formation. I then pump the extract, removed from the top of the column, into a separating zone wherein there is maintained a sufficiently high pressure so that substantially all the oil dissolved in the extract can be precipitated by heating the extract without formation of a gaseous phase. By the term gas phase or gaseous phase, I mean the normal gas phase as distinguished from the homogeneous phase which is characteristic of the critical state. Whereas the formation of a gas or gaseous phase during separation as is occasioned by evaporation of solvent or dissolution of dissolved gas from the solvent is, according to the invention, to be avoided during the separation. The existence or formation of the phase characteristic of the critical state is not objectionable.

Thus, in the case of the above-described fractionation processes, the invention provides the improvement which comprises maintaining the operating pressure in the extraction zone below the pressure of gas phase formation in the separating zone and sufficiently high to maintain liquid solvent in liquid phase and after withdrawing the extract from the extraction zone and before introducing it into the separating zone, wherein organic material is recovered from the extract phase, increasing the pressure to the pressure maintained in the separating zone.

The temperature necessary for precipitation and, consequently, the pressure to be applied depend upon the nature of the solvent as well as that of the oil dissolved in the extract. If the oil constituents are of relatively high molecular weight or if their chemical nature is such that they are only moderately soluble in the solvent, the temperature necessary for substantially complete precipitation can be considerably below the critical temperature of the solvent. I have found that optimum precipitation effects can be achieved at the critical pressure and at temperatures equal to or higher than the critical temperature of the solvent or modified solvent. Under these conditions even relatively low molecular oils can effectively be precipitated, the solvent being freed from substantially all oil which had been dissolved therein, and the recovered solvent is then ready for re-use.

In the first described fractionation process, in which the solvent power of the solvent in the column is adjusted by the temperature with or without additional pressure regulation, the solvent recovered according to my invention is re-used directly without further treatment. However, if I am applying my invention to the process according to my co-pending patent application Ser. No. 451,566, I may, as described in said patent application, drive off some of the dissolved gas from the solvent in order to increase its solvent power before re-using it in a subsequent stage of the process. On the other hand if it is desired to decrease the solvent power for the next stage I shall press more gas into the extract after having pumped it up to the higher pressure but before heating it. In this case the desired precipitation will begin already when the gas is pressed in and will be completed by the heating.

The precipitated phase consists of a solution of solvent in oil usually containing only about 50% solvent or less. This precipitate can be used mainly as reflux to the same and/or feed to another column or it can be withdrawn as product which may or may not be subjected to chemical or adsorption refining or dewaxing. The withdrawn product may then be freed from solvent by distillation in order to obtain the desired oil fraction.

The main advantage of operating the process according to my present invention is the independence of the operating pressure in the fractionating column from that in the precipitating device. In this way I may apply lower operating pressures in the columns which may be of considerable dimensions so that any saving of construction material becomes an essential factor. Likewise it allows to keep the pressure strain in existing equipment as low as possible. Another advantage resides in the fact that I may make full use of the effect of adjusting the operating pressure in the column upon the solvent power of the solvent, as mentioned above, without the pressure requirements of the subsequent precipitation stage interfering with this adjustment.

For reducing my invention to practice I may install suitable pumps, heaters and separators in any of the conventional fractional extraction plants using solvents or solvent mixtures in the paracritical range. In the accompanying drawings, there are set forth flow sheets for extraction plants in which the improvement of the invention is employed. In the drawings:

Fig. 1 is a flow sheet for a plant employing the improvement according to the invention and wherein solvent power is controlled by adjusting the temperature in the extraction zone; and Fig. 2 is a flow sheet for a plant employing the improvement according to the invention and wherein solvent power of the solvent is controlled by adjusting the concentration of a gas dissolved in the solvent.

The two column plant laid out according to the flow sheet shown in Fig. 1 is designed for fractionation with a solvent whose solvent power is varied to suit the purpose by adjusting the temperature in the fractionating columns. It is further designed for refractionating in the second column the top product of the first column. The oil is pumped from the tank 1 with the pump 2 through the mixer 26 to the heater 3 and into the middle of column 4 which is operated at such a temperature $T_1$ that the main part of the oil descending through the column is extracted by the solvent and only a heavy residue remains undissolved. This raffinate or residue is withdrawn from the bottom of column 4 through the valve 5. The solvent enters the column through the valve 6 and ascending through the lower part of the column extracts the soluble part of the oil. The extract phase passes on to the top of the column in counter-current flow to the reflux and is thereby rectified. The rectified extract phase is withdrawn from the column through the line 7 and is pumped by the pump 8 to the heater 9. The increase of operating pressure, essential for my invention is achieved in the heater 9 and in the separator 10 either by throttling the valve 23 while running the pump 8 at a constant rate, or by adjusting the rate of the pump 8 while keeping the position of the valve 23 essentially constant. Major fluctuations of the throughput rate of the plant must, of course, be compensated for by using both these regulating possibilities. Thus, the pressure of the extract phase is hydraulically increased to the pressure maintained in the separator. The extract may be heated in the heater 9 to a relatively high temperature in the paracritical range without interfering with the operation of the rest of the plant. By this increase of temperature the oil fraction dissolved in the extract is precipitated completely or as effectively as desired and is collected in the separator 10. The increase in pressure of the extract is such that in the separator 10, gaseous phase does not form in the separator. Part of the precipitate is refluxed through the valve 12 into the column 4. If desired, the reflux may be cooled to the operating temperature of the column 4 with the aid of the cooler 11. However, it is in many cases favorable not to cool the reflux because a warm reflux does not redissolve in the extract phase as rapidly as a cooled one and is thereby more effective. The warm reflux furthermore creates a temperature gradient in the upper part of the column which causes a further reflux formation without a heating coil having to be installed. The other part of the precipitate is passed through the line 13 and the valve 14 to the cooler 15 in which the temperature of the precipitate is adjusted precisely to the operating temperature of the column 16. This temperature is chosen such that the top fraction off the column 4 entering through the line 13 is divided in the column 16 into two new fractions.

The upper solvent layer freed from the oil by precipitation passes from the top of separator 10 through the cooler 21 where it is cooled to the operating temperature of column 16 to which it is admitted through valve 23 and line 22.

The operating method and the equipment of the column 16 are the same as of the column 4. The top fraction of the column 4 which is passed to the column 16 through the line 13 is refractionated there in the same manner as described for column 4 and is separated into a bottom fraction $F_2$ which is withdrawn by the valve 34 and a top fraction $F_3$ which is withdrawn through the valve 14a. The other accessories 8a, 9a, 10a, 11a and 12a, with which the column 16 is equipped correspond in their function to the accessories 8, 9, 10, 11 and 12 of column 4.

The solvent which has been recovered from the extract phase by precipitation and which had been separated in the separator 11a from the precipitated top fraction is cooled in the cooler 21a to the operating temperature of the column 4 and passes through the line 22a to the above-mentioned valve 6. The fractions $F_2$ and $F_3$ may, if desired, be refractionated in the same manner as described above in further columns not shown in Fig. 1.

The fresh solvent for starting the plant and for replenishing is taken from the tank 17 through pump 18, the line 19, and the heat exchanger 20 which heats it to the operating temperature of the column 16. Once the solvent recirculation is completely functioning, it is no longer necessary to heat the solvent in the heat exchanger 20. In certain cases if highly viscous oil, or such oils which contain a very heavy residue, are to be fractionated, it is especially useful to pre-dilute the oil from tank 1 with solvent from the tank 17 before it enters the column 4. This pre-dilution is carried out at a relatively low temperature, i.e., before the oil is heated in the heat exchanger 3 to operating temperature of the column 4. Pump 18 pumps fresh solvent from the tank 17 through the line 24 and the valve 25 to the mixer 26 in which the pre-dilution is carried out. The amount of solvent necessary for the pre-dilution must, of course, be recovered from the system at some other place. Usually the percentage of solvent present in the fractions withdrawn and recovered by distillation in a special recovering plant not shown in the figure, suffices for replenishing the solvent. However, if this amount of solvent is not sufficient an additional amount may be expanded through the valve 27 into the evaporator 28 which is provided with a heating coil 29. The solvent vapors from the evaporator 28 are condensed in the condenser 30, and the condensate flow through the line 31 to the tank 17. The distillation residue is cooled in the cooler 32 and is withdrawn from the valve 33 as fraction $F_1a$.

If I wish to apply my invention to a process according to my copending application Ser. No. 451,566 I may use a plant laid out, for instance, as that shown in Fig. 2. It should, however, be noted that the invention can be used for all the alternative flow sheets of said application. The oil to be fractionated is pumped from the feed tank 51 with pump 52 to the mixer 55 in which it is blended with the make-up solvent pumped from tank 53 with pump 54. This make-up solvent compensates for the amount of solvent withdrawn with the fractions $F_1$–$F_4$ and recovered in solvent evaporators not shown in the diagram. Especially in large installations I may similarly choose to admit a compensating amount of gas to the mixer 55 through valve 84 from the tank 83. The mixture of oil and solvent with or without the gas enters the column 56 where it meets a stream of solvent, whose solvent power has been reduced to the desired degree by addition of a predetermined amount of modifying gas in the mixer 75. The modified solvent (i.e., solvent having gas dissolved therein) is admitted to the bottom end of the column by the valve 57. According to my invention I prefer to operate column 56 at a pressure which only moderately exceeds the saturation pressure of the solvent at the operating temperature which is preferably about room temperature. The extract phase formed in the column is withdrawn from the top of the column and the pressure thereof is hydraulically increased by pump 58 which pumps it to the higher pressure at which the precipitation by temperature increase to a temperature in the paracritical range is to take place. The extract phase is heated to the precipitating temperature in the heater 59 and the emulsion formed is separated in the separator 60. In the separator 60, separation occurs without the formation of gaseous phase. The lower layer is cooled in the cooler 61 and partly recirculated through valve 62 as reflux to the top of column 56. The rest of the precipitate layer is withdrawn through valve 63. It usually contains about 50% by volume of modified solvent, which is recovered by evaporating means not shown. The liquid solvent recovered is returned to tank 53 and the gas to tank 83 for reuse. The oil freed from the solvent constitutes fraction $F_1$ consisting of those constituents of the oil feed which are most soluble in the highly modified solvent.

The upper layer in separator 60 is modified solvent, which is passed into the stripper 65 for removing part of the modifying gas, which is returned to the tank 83. In most cases, especially if I am fractionating relatively high molecular oils such as crude oil residue, bright stocks, soluble synthetic resins, bodied drying oils, and even glycerides such as natural oils and fats, the temperature of the solvent mixture in the separator 60 and in the stripper 65 can be kept sufficiently below the critical conditions characterized by the degree of modification of the solvent, so that the operating pressure of the stripper nevertheless exceeds that of tank 83. In this case the gas flow is simply regulated by the valve 69. The gas is freed from solvent vapors in the reflux condenser 68. The stripping effect may even be enhanced by heating means 66. However, if I am fractionating oils of lower molecular weight, such as distilled luboils, glycerides, or natural or synthetic mixtures of fatty and/or resinous acids such as tall oil, or fatty acids obtained by refining, saponification, or hydrolysis of natural fats and oils, the critical temperature of the solvent mixture modified according to my copending patent application Ser. No. 451,566 may be so low that it lies close above, at, or even below the temperature necessary for efficient precipitation in the heater 59 and for separation in the separator 60. In this case it may be difficult or impossible to obtain two phases, gas and liquid in the stripper 65. I then prefer to expand the solvent layer from the separator 60 through the valve 64 into the stripper 65, the valve 69 being closed. By proper manipulation of the reflux condenser 68 and of the valves 64 and 85 I can adjust the pressure and temperature conditions of the stripper sufficiently below the critical conditions, so that the stripper can be operated in a conventional manner. The booster compressor 87 serves to recompress the gas through valve 86 into tank 83.

The solvent whose solvent power has been adjusted to the value desired for the operation of column 71a by either one of the stripping operations described is then cooled in the cooler 67 to the extraction temperature and passed through valve 72a into the column 71a.

In the type of operation chosen for Fig. 2, the extraction residue, which has remained undissolved in column 56 constitutes the major part of the oil and is therefore refractionated in column 71 to which it is admitted through valve 70. The solvent passed into this column through valve 72 contains less gas than that used in column 56 and is therefore capable of dissolving more of the less soluble oil constituents. The extract phase obtained in this column is removed by pump 74 and pumped to a higher pressure for being pressurized with more gas and precipitated by heating. The amount of gas admitted to the mixer 75 through valve 76 is adjusted to result in the desired degree of modification for the solvent power needed in column 56. This reduction of solvent power causes a precipitation of the oil from the extract. This precipitation is, however, often insufficient for freeing the solvent from oil. In addition, I apply the same kind of heating step as described for the plant according to Fig. 1 and for the extract from column 56 in Fig. 2. Thus the partially precipitated extract phase is heated in the heater 77 whereby the precipitation is completed and the emulsion formed is allowed to settle in the separator 78 where the withdrawn extract phase including solvent having gas dissolved therein separates without gas phase formation. The lower layer is withdrawn and cooled in the cooler 79. Part of it is refluxed to column 71 through valve 80 and the rest is withdrawn through valve 81 for further treatment which may comprise bleaching, dewaxing and the like and eventually removal of the modifying gas and the solvent as described above for fraction $F_1$.

The hot solvent emerging from the top of the separator 78 is cooled in the cooler 82 and admitted by valve 57 to column 56.

The residue of the extraction in column 71 is passed through valve 73 on to column 71a where it is subjected to countercurrent extraction in exactly the same manner as described for column 71. The only difference is that the solvent entering through valve 72a possesses the highest solvent power used in this plant after having been partly freed from gas in the stripper 65 as described above. It should further be noted that the heater 77a is arranged in this case before the mixer 75a so that the precipitation of the oil from the extract is initiated by heating and completed by pressurizing with more gas instead of vice versa. This alternative is equivalent to the procedure described for precipitating the extract obtained from column 71 but the rate of dissolution of the gas in the liquid solvent may be somewhat lower in the hot solvent than in the cold one. The alternative is shown here merely for demonstration. The precipitate from the extract yields the fraction $F_3$ and the extraction residue is withdrawn through valve 73a and yields fraction $F_4$. The fractions $F_2$, $F_3$, and $F_4$ are recovered by removing the modifying gas and the solvent therefrom in conventional evaporation equipment not shown in the figure.

The solvent recovered from the various fractions withdrawn is restored to the plant by pre-diluting the oil in the mixer 55 as described above.

The recovered modifying gas may either be restored to the mixer 55 through valve 84 or to the mixers 75 and 75a through the valves 76 and 76a.

In order to make my invention more clear, I am describing below specific examples of putting the invention into practice:

*Example 1*

In this example a plant according to Fig. 1 was used. Crude soybean oil was pumped by pump 2 into column 4 where it was intimately contacted with liquid propane introduced into the column through line 22a. Column 4 was operated at a temperature of 70° C. and a pressure of 30 atmospheres gauge, i.e., ca. 5 atmospheres above the vapor pressure of the propane solvent. A raffinate phase and an extract phase formed in the column. The raffinate phase was removed from the bottom of the column as fraction $F_1$, and the extract phase was removed from the top of the column through line 7, and was pumped by pump 8 to a pressure of 45 atmospheres gauge. At this pressure the extract phase was heated in heater 9 to 85° C. This heating resulted in an emulsion forming in the extract phase, and this emulsion was introduced into separator 10. In the separator 10, the emulsion was retained in liquid phase without evaporation of extract phase, and it separated into a solvent phase and a precipitate phase. The upper layer, or solvent phase, was withdrawn from th separator 10, cooled in cooler 21 to 80° C. and then introduced into column 16. A portion of the precipitate phase was passed through line 13 to column 16 for further fractionation thereof, and the balance of the precipitate phase was passed through cooler 11, where it was cooled to 70° C., and from the cooler 11, it was passed to the top of column 4 as reflux.

This treatment of the extract phase resulted in good separation thereof into a precipitate phase and solvent phase. The solvent phase contained but a small amount of oil. The amount of oil in the solvent phase can be still further reduced by employing a pressure of 45 atmospheres gauge and heating it to 95° C. At these last mentioned conditions, residual oil in the propane can be reduced to practically nil.

In column 16 precipitate phase or oil from line 13 is intimately contacted with solvent which enters the column from line 19, and extraction of the oil phase results and a residue phase and an extract is formed. The residue phase is withdrawn from the bottom of the column 16 as fraction $F_2$, and the extract phase is withdrawn from the top of column 16. Column 16 was operated at a temperature of 80° C. and a pressure of 35 atmospheres gauge, and the extract phase withdrawn at the top of this column was pumped to 42 atmospheres gauge by pump 8a and heated to 100° C. with heater 9a. This pressure is the critical pressure of the solvent. The effluent from the heater 9a was introduced into the separator 10a where separation into a solvent phase and a precipitate phase containing even the most soluble oil constituents of the extract phase formed. The solvent phase, which was practically pure propane, was withdrawn from separator 10a, cooled in cooler 21a and passed to column 4. Precipitate phase was withdrawn from separator 10a and cooled to 85° C. in cooler 11a. A portion of the cooled precipitate phase was returned to the column 16 as reflux at 85° C. (5° C. above the operating temperature of column 16) and the balance of the cooled precipitate phase was withdrawn as fraction $F_3$.

In the separators 10 and 10a, the pressure was such that there was no gaseous phase formation during the separations.

*Example 2*

A plant laid out according to Fig. 2 was used for fractionating crude linseed oil. The solvent employed was a propane-propylene cut modified with methane. All three columns were operated at 20° C. In column 56 the operating pressure was held at 40 atm. g. while the saturation pressure of methane in the solvent was adjusted to 35 atm. Column 71 was operated at 38 atm. g., with a solvent mixture possessing a methane saturation pressure of 33 atm. and column 71a at 37 atm. g. with a saturation pressure of 30 atm.

The extract phase from column 56 was pumped to a pressure of 70 atm. g. by pump 58 and heated to 60° C. The lower layer in the separator 60 was held at a constant level which was used to control the rate of its withdrawal through the valves 62 and 63, the proportion of flow rates through these valves being adjusted to 4/1, the refluxe ratio chosen for column 56.

The upper layer containing practically no oil entered the stripper 65 where so much methane was removed through valve 69 that the saturation pressure of the solvent after cooling to 20° C. was 30 atm. suitable for column 71a. The extraction residue from column 56 was passed on through valve 70 to column 71. The extract obtained in this column was pumped from 38 to 62 atm. g. with pump 74 and sufficient methane was pressed through valve 76 into the mixer 75 to increase the saturation pressure from 33 to 35 atm. The partially precipitated mixture was heated in the heater 77 to 65° C. in order to complete the precipitation. By proper manipulation of valves 80 and 81 a reflux ratio of 3/1 was maintained for column 71 in a manner similar to that described for column 56. The extraction residue was passed from the bottom of column 71 through valve 73 into the column 71a. The extract from this column was pumped from 37 to 62 atm. g. and heated to 67° C. for precipitation. A sufficient amount of methane was passed into the mixer 75a to increase the saturation pressure, measured at 20° C., to 33 atm. Thereby the precipitation was completed. The further manipulation of the unit was exactly analogous to that described for column 71 and its accessories.

In the separators 60, 78 and 78a, the operating pressure was such that gaseous phase did not form during the separation.

The yields and properties of the fractions $F_1$ to $F_4$ after being freed from the solvent and the modifying gas are given in the following table:

|  | Feed | $F_1$ | $F_2$ | $F_3$ | $F_4$ |
|---|---|---|---|---|---|
| Color (Gardner) | 10 | 2 | 3 | 4 | >18 |
| Iodine number | 176 | 140 | 169 | 203 | 165 |
| Saponification number | 192 | 192 | 192 | 190 | 195 |
| Acid number | 3.1 | 22 | 1.2 | 0.3 | 4.1 |
| Phosphorus, percent | 0.02 | nil | 0.0001 | 0.0003 | 0.5 |
| Yield, percent |  | 10 | 52 | 35 | 3 |

This application is a continuation-in-part of application Serial No. 451,567, filed August 23, 1954, now abandoned.

I claim:
1. In the method for fractionating high-molecular organic material by solvent extraction, in which the material to be fractionated is intimately contacted with a liquid solvent for said material under conditions relatively remote from the critical state of said liquid solvent in an extraction zone, to thereby cause the formation of non-gaseous phases consisting of a liquid extract phase including some of the organic material dissolved in the solvent and a raffinate phase, the liquid extract phase is withdrawn from the extraction zone and introduced into a separating zone where it is maintained at physical conditions of temperature and pressure, shifted at least part of the way toward the critical state, said temperature being in the para-critical range of the solvent present in the extract phase and said pressure being sufficient to prevent formation of a gaseous phase, to effect the separation of the extract phase into a solvent phase and a precipitate phase, the improvement which comprises maintaining the operating pressure in the extraction zone at a pressure ensuring the formation of non-gaseous phases, said pressure being below the pressure in the separating zone, but being sufficiently high to maintain the liquid solvent in the liquid phase and after withdrawing the liquid extract phase from the extraction zone and before introducing it into the separating zone increasing the pressure of the said extract phase to the pressure maintained in said separating zone.

2. The improvement according to claim 1, wherein following said separation, a portion of said precipitate phase is recycled to said extraction zone.

3. The improvement according to claim 1, wherein in the separation zone the pressure is the critical pressure of the solvent and the temperature is at least equal to the critical temperature of the solvent.

4. The improvement according to claim 1, wherein following the increasing of the pressure of the extract and before the separation thereof into a solvent phase and a precipitate phase, gas is introduced into the extract to modify its solvent power.

5. In the method for fractionating high-molecular organic material by solvent extraction, in which the material to be fractionated is intimately contacted with a modified liquid solvent having a gas dissolved therein under conditions relatively remote from the critical state of said liquid solvent in an extraction zone, to thereby cause the formation of non-gaseous phases consisting of a liquid extract phase including some of the organic material dissolved in the solvent and a raffinate phase, the liquid extract phase is withdrawn from the extraction zone and introduced into a separating zone where it is maintained at physical conditions of temperature and pressure, shifted at least part of the way toward the critical state, said temperature being in the paracritical range of the solvent present in the extract phase and with the gas dissolved therein and said pressure being sufficient to prevent formation of a gaseous phase, to effect the separation of the extract phase into a solvent phase and a precipitate phase, the improvement which comprises maintaining the operating pressure in the extraction zone at a pressure ensuring the formation of non-gaseous phases, said pressure being below the pressure in the separating zone, but being sufficiently high to maintain the liquid solvent in the liquid phase and after withdrawing the liquid extract phase from the extraction zone and before introducing it into the separating zone increasing the pressure of the said extract phase to the pressure maintained in said separating zone.

6. The improvement according to claim 5, wherein precipitate phase is withdrawn from the separating zone and recycled to the extraction zone.

7. The method according to claim 5, wherein in the separating zone the pressure of the solvent is the critical pressure and the temperature is at least equal to the critical temperature of the solvent.

References Cited in the file of this patent

UNITED STATES PATENTS

| 2,130,147 | Milmore | Sept. 13, 1938 |
| 2,188,012 | Pilat | Jan. 23, 1940 |
| 2,202,389 | Lewis | May 28, 1940 |
| 2,270,674 | Pilat | Jan. 20, 1942 |
| 2,284,583 | Lewis | May 26, 1942 |